United States Patent [19]

Suyama

[11] Patent Number: 4,866,627

[45] Date of Patent: Sep. 12, 1989

[54] DIRECTION FINDER

[75] Inventor: Michiyo Suyama, Hyogo, Japan

[73] Assignee: Mitsubishi Denki Kabushiki Kaisha, Tokyo, Japan

[21] Appl. No.: 62,663

[22] Filed: Jun. 16, 1987

[30] Foreign Application Priority Data

Jun. 16, 1986 [JP] Japan .................................. 61-139602

[51] Int. Cl.$^4$ ..................... G06F 15/50; G01C 17/38
[52] U.S. Cl. ............................. 364/457; 364/571.01; 364/571.02; 364/444; 364/449; 340/988; 33/356
[58] Field of Search ................ 364/457, 449, 577; 33/352, 356, 357; 73/178 R; 340/988

[56] References Cited

U.S. PATENT DOCUMENTS

| | | | |
|---|---|---|---|
| 4,300,390 | 11/1981 | Shimizu | 33/352 |
| 4,445,279 | 5/1984 | Tsushima et al. | 364/571 |
| 4,593,359 | 6/1986 | Sadeh | 364/449 |
| 4,611,293 | 9/1986 | Hatch et al. | 364/571 |
| 4,642,776 | 2/1987 | Matsumoto et al. | 364/449 |
| 4,660,161 | 4/1987 | Okada | 364/457 |
| 4,663,719 | 5/1987 | Matsumoto et al. | 364/449 |
| 4,672,565 | 6/1987 | Kuno et al. | 33/357 |
| 4,673,878 | 6/1987 | Tsushima et al. | 364/449 |
| 4,688,176 | 8/1987 | Hirata | 364/571 |
| 4,725,957 | 2/1988 | Alberter et al. | 364/449 |

Primary Examiner—Parshotam S. Lall
Assistant Examiner—Ellis B. Ramirez
Attorney, Agent, or Firm—Sughrue, Mion, Zinn, Macpeak & Seas

[57] ABSTRACT

A direction finder includes a terrestrial magnetism sensor, a magnetization correction means for correcting an output of the sensor with a magnetic field component produced by a vehicle itself on which the sensor is mounted and a correction amending means for amending a corrected output on the basis of coordinates of a cross point of a line extending perpendicularly from a coordinates corresponding to a correction amount produced by the magnetization correction means onto a perpendicular bisector of a line segment connecting two coordinates points obtained by the sensor at different time instances.

5 Claims, 5 Drawing Sheets

FIG. 9a
FIG. 9b
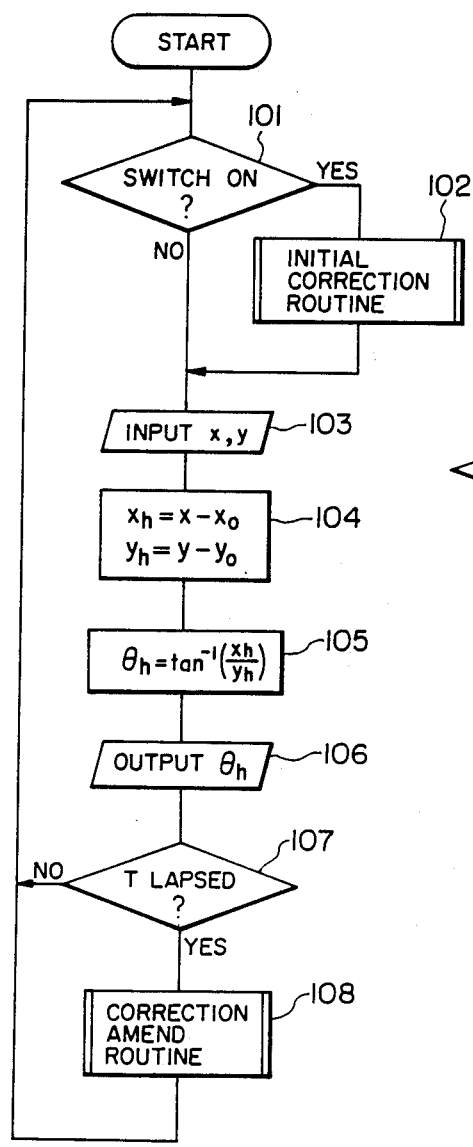
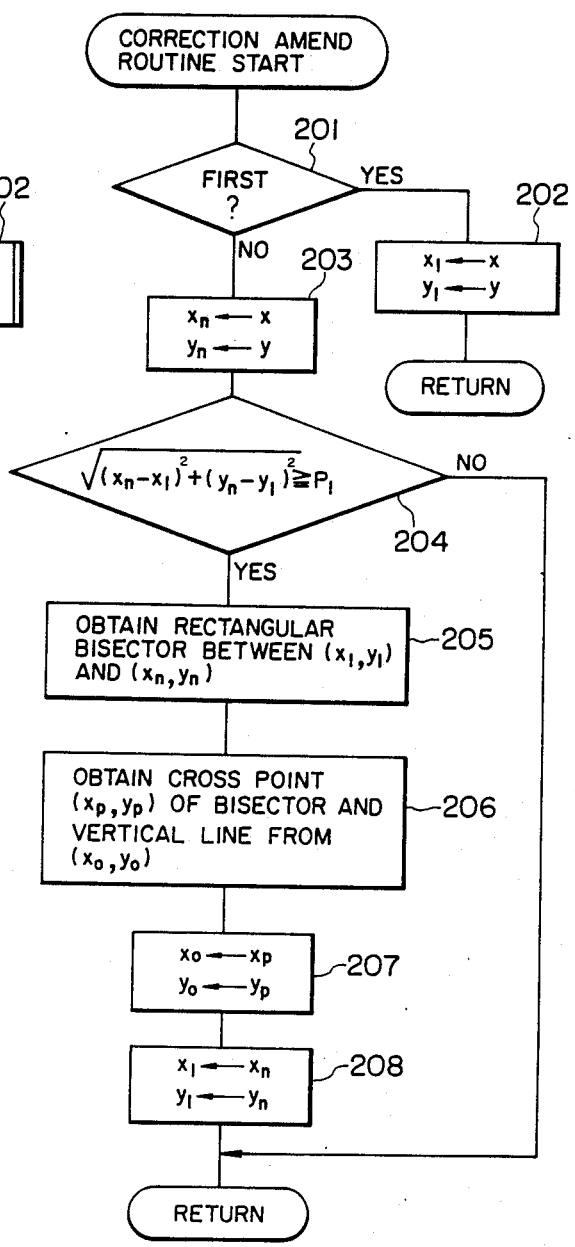

DIRECTION FINDER

BACKGROUND OF THE INVENTION

The present invention relates to a direction finder for use in a navigation system of a vehicle, which is capable of finding a moving direction of the vehicle on the basis of terrestrial magnetism.

There have been many navigation systems of this type and they are based on a principle which is shown in FIGS. 1 and 2. In FIG. 1, a horizontal component H of terrestrial magnetism, which is referred to as "terrestrial magnetism H" hereinafter, is detected by a terrestrial magnetism sensor 2 mounted on a vehicle 1, e.g., an automobile, whose heading makes an angle $\theta$ with respect to the direction of terrestrial magnetism H, i.e., north. That is, the sensor 2 detects a field component Hy ($=H \cos \theta$) of the magnetism H which is parallel to the moving direction A of the vehicle 1 and a field component Hx ($=H \sin \theta$) orthogonal to the direction A and provides electric signals x and y in the form of, for example, voltages corresponding thereto. The electric signals x and y are amplified suitably. Thus, the electric signals x and y can be expressed by $$x = K\, Hx = K\, H \sin \theta \tag{1a}$$

$$y = K\, Hy = K\, H \cos \theta \tag{1b}$$

where K is a magnetism/voltage conversion coefficient.

The detected signals x and y when the field components Hx and Hy are zero are calibrated to zero so that the magnitudes of the signals x and y are proportional to the intensities of the components Hx and Hy, respectively and can be used as reference values.

FIG. 2 shows an x-y rectangular coordinate system on which points each defined by magnitudes of the electric signals x and y are plotted. A locus of the plot describes a circle $O_1$ and the angle $\theta$, i.e., the orientation $\theta$ of the vehicle 1 is given by $$\theta = \tan^{-1}(x/y) \tag{2}$$

The direction of the terrestrial magnetism H is not coincident with the geographical north and there is an error, i.e., declination therebetween. The declination depends on the area of the earth in which it is calculated. It is assumed in this description, however, that there is no declination for simplicity of explanation.

It has been known that, due to magnetization of magnetic material of various components constituting the vehicle, the orientation $\theta$ calculated according to the equation (2) is not always correct.

Describing this in more detail with respect to FIGS. 3 and 4, the vehicle 1 is subjected to a magnetic field Hv shown in FIG. 3 produced by those magnetized components. With the magnetic field Hv, the magnetic field to be detected by the terrestrial magnetism sensor 2 becomes a composite magnetic field He of the terrestrial magnetism H and the magnetic field Hv. Coordinates (x,y), ($x_v,y_v$) and ($x_e,y_e$) of signals from the sensor 2, corresponding to coordinates (Hx,Hy), (Hvx,Hvy) and (Hex,Hey), are shown in FIG. 4. Thus, the signals xe and ye from the sensor 2 are represented by $$x_e = x + x_v = KH \sin \theta + x_v \tag{3a}$$

$$y_e = y + y_v = KH \cos \theta + y_v \tag{3b}$$

where the angle $\theta_e$ obtained from the signals $x_e$ and $y_e$ according to the equation (2) becomes $$\theta_e = \tan^{-1}(x_e/y_e) \tag{4}$$

Thus, a true orientation $\theta$ cannot be obtained.

However, since the field Hv is produced by the vehicle 1 as a permanent magnet and an intensity and direction thereof with respect to the moving direction A of the vehicle 1 are constant, the coordinates ($x_v,y_v$) of the signal corresponding to the magnetic field Hv shown in FIG. 4 is kept unchanged even if the direction A is changed. Therefore, a locus of the coordinates ($x_e,y_e$) of the detection signal when the vehicle 1 runs once along a circle becomes a circle $O_2$ having a center point ($x_v,y_v$) as is clear from the equations (3a) and (3b). Therefore, by obtaining the center coordinates ($x_v,y_v$) of the circle $O_2$ from the detection signals $x_e$ and $y_e$, the true orientation $\theta$ can be obtained easily from the following equation $$\theta = \tan^{-1}((x_e - x_v)/(y_e - y_v)) \tag{5}$$

Japanese Patent Application Laid-Open No. 148210/1982 discloses a technique by which the true orientation $\theta$ is obtained by cancelling out influences of the magnetic field Hv on the basis of the principle mentioned above. In detail, among the detection signals x and y obtained from the terrestrial magnetism sensor 2 when the vehicle 1 circles once, maximum values $x_{max}$ and $y_{max}$ and minimum values $x_{min}$ and $y_{min}$ in the respective axes of the x—y rectangular coordinate system are stored and the detection signals $x_v$ and $y_v$ corresponding to the magnetic field Hv are obtained as coordinates of the center of the circular locus $O_2$, according to the following equations $$x_v = (x_{max} + x_{min})/2 \tag{6a}$$

$$y_v = (y_{max} + y_{min})/2 \tag{6b}$$

Therefore, by turning around the vehicle 1 in a suitable time to obtain the detection signals $x_v$ and $y_v$ corresponding to the magnetic field Hv, it is possible to obtain the true orientation $\theta$ by performing an operation of the equation (5).

However, when the vehicle 1 is, for example, an automobile, it is subjected to vibrations during its movement. Therefore, the magnetic field Hv may vary gradually as shown in FIG. 5, although the variation might be negligible when averaged over, for example, one day. In addition, when the automobile crosses a railroad using a d.c. electrical system at a time instance $t_o$, it may be magnetized by a magnetic field produced by a d.c. current flowing through the rails and cables and thus the intensity and direction of the field Hv are considerably changed. With such change of the field Hv, the automobile must circle again to obtain the signals $x_v$ and $y_v$ corresponding to the changed field Hv. This is very difficult to do as a practical matter.

SUMMARY OF THE INVENTION

An object of the present invention is to provide an orientation finder for a moving body, by which a variation of a magnetic field Hv can be automatically compensated for, without special maneuvering of the moving body.

The orientation finder according to the present invention includes a terrestrial magnetism sensor, a magnetization correcting means for obtaining an amount of correction of magnetic field intensity and a correction amending means responsive to two pairs of detection signals from the terrestrial magnetism sensor for obtaining a perpendicular bisector of a line segment connecting two coordinates corresponding to the two signal pairs and amending the correction amount of the magnetic field intensity from the magnetization correcting means on the basis of coordinates of a cross point of a line extending perpendicularly from a coordinate correction amount from the magnetization correction means onto the line segment.

In the present invention, the correction amount is amended by the correction amending means on the basis of the two pairs of detection signals from the terrestrial magnetism sensor and the detection signals are corrected according to the amended correction amount.

BRIEF DESCRIPTION OF THE DRAWINGS

FIGS. 9a and 9b are flow-charts showing an operation of a microcomputer shown in FIG. 8.

DETAILED DESCRIPTION OF THE PREFERRED EMBODIMENTS

An embodiment of the present invention will be described with reference to FIGS. 6 to 9a.

Figure 1:
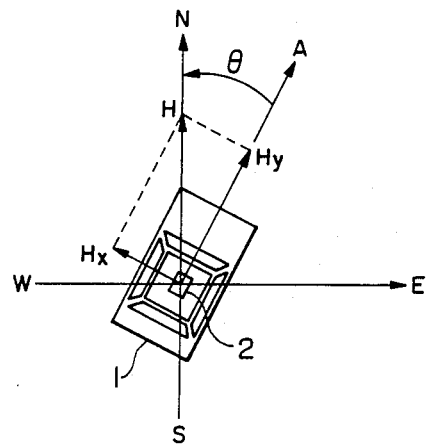
FIGS. 1 and 2 show the principle of the orientation finder assuming there is no magnetic field.
Figure 2:
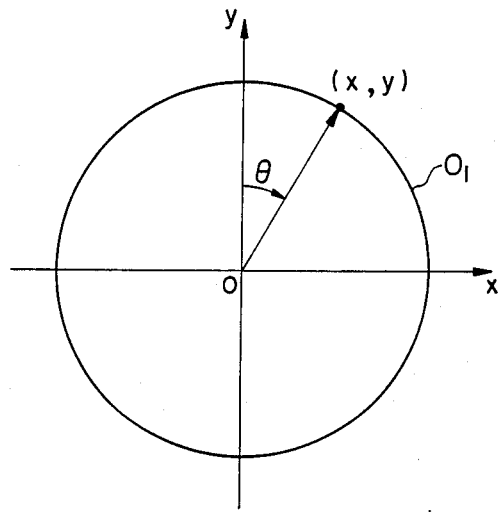
Figure 3:
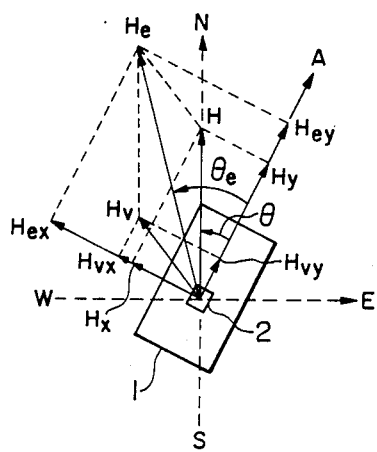
FIGS. 3 and 4 show the principle of the orientation finder when there is a magnetic field.
Figure 4:
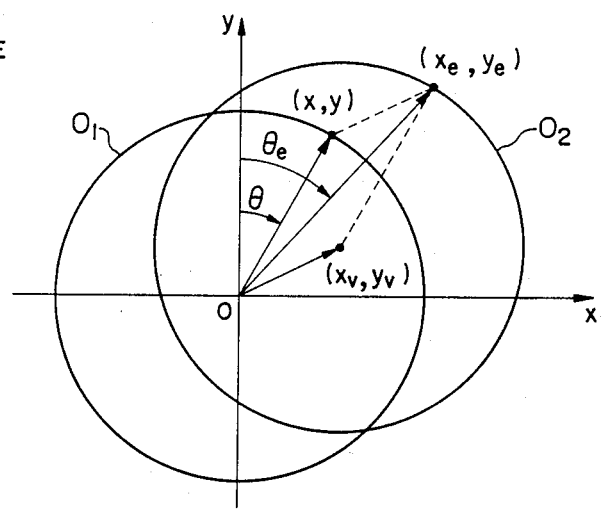
Figure 6:
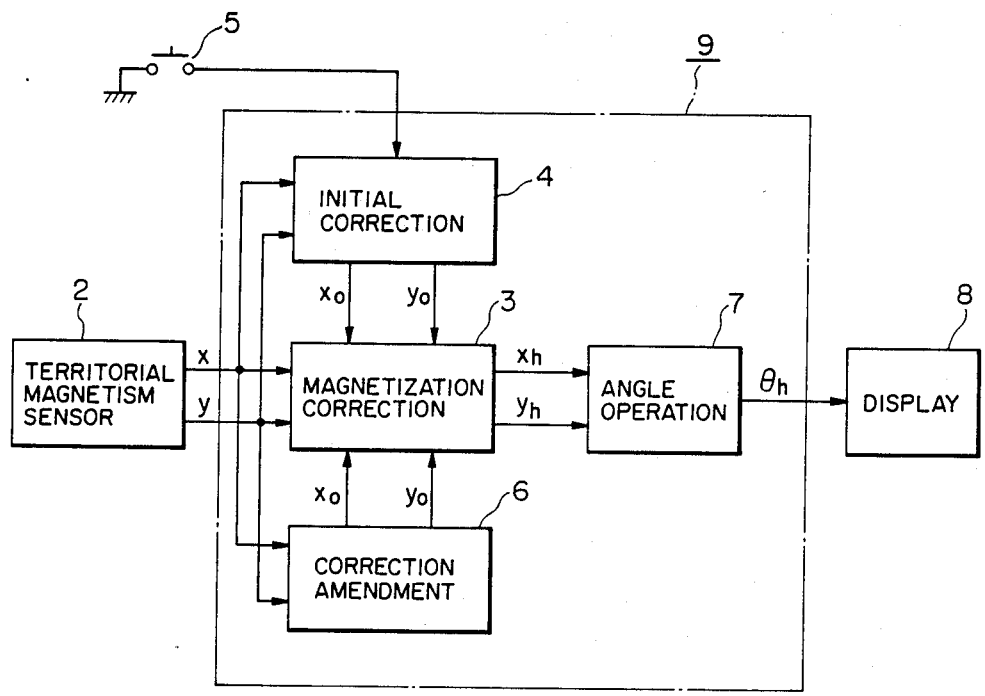
FIG. 6 is a block diagram of an embodiment of the present invention.

In FIG. 6, the navigation system includes a terrestrial magnetism sensor 2 which is identical to that shown in FIG. 1, a magnetization correction means 3 for correcting detection signals x and y obtained by the terrestrial magnetism sensor 2 on the basis of a pair of correction amounts $x_o$ and $y_o$ by which an influence of a magnetic field Hv is cancelled out, according to the following equations $$x_h = x - x_o \tag{7a}$$

$$y_h = y - y_o \tag{7b}$$

and providing a pair of corrected detection signals $x_h$ and $y_h$, an initial correction means 4 which is actuated by an operation of a switch 5 to detect and store the detection signals x and y upon a turning operation of a moving body 1, to obtain detection signals $x_v$ and $y_v$ corresponding to the magnetic field Hv according to the equations (6a) and (6b) and to set the values $x_v$ and $y_v$ to the correction values $x_o$ and $y_o$ for a subsequent use in the magnetization correction means 3, a correction amending means 6 responsive to the detection signals x and y from the sensor 2 for amending the corrected values $x_o$ and $y_o$ such that the values approach coordinates $(x_v, y_v)$ on an x-y rectangular coordinate system corresponding to changed magnetic field Hv, an angle calculation means 7 responsive to the correction detection signals $x_h$ and $y_h$ from the magnetization correction means 3 to operate an orientation $\theta h$ according to $$\theta = \tan^{-1}(x_h / y_h) \tag{8}$$

and a display means 8 for displaying the orientation $\theta h$ from the angle calculation means 7. The components depicted by reference numerals 3, 4, 6 and 7 constitute a control means 9.

Figure 7:
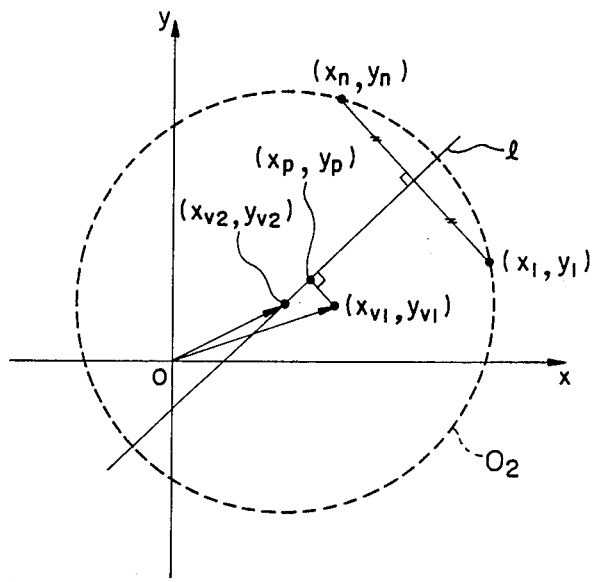
FIG. 7 is a graph showing a principle of operation of a correction amount amending means in FIG. 6.

A principle of operation of the correction amending means 6 will be described with reference to FIG. 7. In FIG. 7, it is assumed that coordinates on the x-y rectangular coordinate system of the magnetic field Hv are represented by $(x_{v1}, y_{v1})$ and $(x_{v2}, y_{v2})$, respectively, coordinates corresponding to the detection signal pair obtained after the magnetic field Hv varies to Hv2 are represented by $(x_l, y_l)$ and $(x_n, y_n)$, respectively, and values set as the correction values $x_o$ and $y_o$ of the magnetization correction means 3 before the field Hv changes are represented by $x_v$ and $y_v$, respectively.

The perpendicular bisector l of the line between the coordinates $(x_l, y_l)$ and $(x_n, y_n)$ corresponding to the detection signals obtained after the field Hv is changed to Hv2 passes, necessarily, through the coordinates $(x_{v2}, y_{v2})$ corresponding to the field Hv2 and representing coordinates of a cross point of the line l and a perpendicular line extending from the coordinates $(x_{vl}, y_{vl})$ corresponding to the field Hv1 to the line by $(x_p, y_p)$, the following equation (9) is established between the coordinates $(x_{v1}, y_{v1})$, $(x_{v2}, y_{v2})$ and $(x_p, y_p)$ $$(x_{v2} - x_p)^2 + (y_{v2} - y_p)^2 \leq (x_{v1} - x_p)^2 + (y_{v1} - y_p)^2 \tag{9}$$

Therefore, the coordinates $(x_p, y_p)$ of the cross point becomes equal to or at least closer to the coordinates corresponding to the field Hv2 than the coordinates $(x_o, y_o)$ corresponding to the correction amount before the magnetic field Hv is Hv1, i.e., the coordinates $(x_{vl}, y_{vl})$. Thus, after the magnetic field is changed, the components $x_p$ and $y_p$ of the coordinates $(x_p, y_p)$ of the cross-point are set as the correction amounts $x_o$ and $y_o$. By repeating this operation, it is possible to proximate the correction amounts $x_o$ and $y_o$ to the components $x_{v2}$ and $y_{v2}$ corresponding to the magnetic field Hv2, i.e., the correction amounts necessary to cancel out the influence of the magnetic field Hv2.

Figure 8:
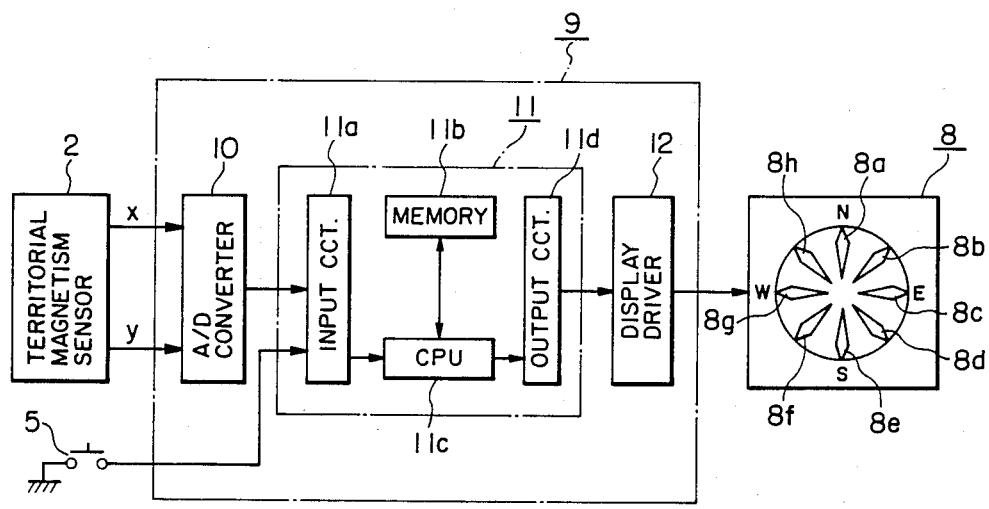
FIG. 8 shows a block diagram of the embodiment in FIG. 6 in more detail.

FIG. 8 shows the embodiment in FIG. 6 in more detail in which same components are depicted by same reference numerals, respectively. In FIG. 8, the control means 9 comprises an A/D converter 10 for converting the detection signals x and y from the terrestrial magnetism sensor 2 into digital values, a microcomputer 11 composed of an input circuit 11a, a memory 11b, a central processing unit (CPU) 11c and an output circuit 11d and a display driver 12 responsive to an output of the computer 11 for driving the display 8. The display 8 which may include a liquid crystal display panel has display segments 8a to 8h which are driven by an output of the driver 12 to illuminate one at a time for displaying the orientation $\theta h$.

An operation of the computer 11 will be described with reference to the flow-charts shown in FIGS. 9a and 9b.

In FIG. 9a, when a power source (not shown) is connected by operating the switch 5, the terrestrial magnetism sensor 2, the control circuit 9 and the display 8 initiate operation. That is, the sensor 2 starts to detect terrestrial magnetism H and provides detection signals x and y corresponding to the x and y components thereof which are A/D converted by the A/D converter 10 and then the digitized signals are supplied to the computer 11.

The computer 11 performs a main routine starting from the step 101, as shown in FIG. 9a. In the step 101, it is determined whether or not the switch 5 is turned on. If yes, the initial correction routine is performed in the step 102 to obtain the correction amounts $x_o$ and $y_o$.

An operation of the magnetization correction means 3 is shown in the steps 103 and 104. That is, the detection signals x and y are inputted in the step 103 and then the correction detection signals $x_h$ and $y_h$ are obtained according to the equations 7a and 7b in the step 104.

Then, the orientation $\theta h$ is obtained according to the equation (8) in the step 105 and the signal $\theta h$ is provided to the display driver 12 in the step 106. The steps 105 and 106 correspond to an operation of the angle calculation means 7. The display driver 12 drives the display 8 to cause it to display the orientation $\theta h$ by illuminating a suitable one of the display segments 8a to 8h thereof.

Thereafter, within a predetermined period T, the routine is returned to the step 101 and the same operation is repeated until the time period T lapses.

When the time period T lapses while the operation of the magnetization correction means 3 is repeated through the steps 101 to 107, a correction amending routine is performed in the step 108, which is shown by the flow-chart in FIG. 9b.

In the correction amending routine, it is determined in step 201 whether or not execution of the routine this is the first time for. If yes, the detection signals x and y obtained in the step 103 are set as reference detection signals $x_l$ and $y_l$ in the step 202 and it is returned to the main routine shown in FIG. 9a.

It is determined in the step 201 that it is not the first time for the amending routine, newest detection signals x and y obtained in the step 103 are set as current detection signals $x_n$ and $y_n$ in the step 203. Then, in the step 204, it is determined whether or not a distance $\{(x_{n-xl})^2+(y_n-y_l)^2\}^{\frac{1}{2}}$ between the coordinates corresponding to the current detection signals $x_n$ and $y_n$ and the reference detection signals $x_l$ and $y_l$, respectively, is equal to or larger than a first predetermined value $p_l$. If yes, the correction values $x_o$ and $y_o$ are amended through the steps 205 to 208. If no, it is returned to the main routine shown in FIG. 9a.

Describing the amending operation in more detail, the perpendicular bisector 1 with respect to the coordinates $(x_l, y_l)$ and $(x_n, y_n)$ of the respective detection signals is obtained in the step 205.

Assuming that the perpendicular bisector 1 is represented by $$y = ax + b \tag{10}$$

The constants a and b are given by the following equations $$a = (x_n - x_l)/(y_n + y_l) \tag{10a}$$

$$b = \{(x_l^2 + y_l^2) - (x_n^2 + y_n^2)\}/2(y_l - y_n) \tag{10b}$$

Then, in the step 206, the coordinates $(x_p, y_p)$ of the cross point of the bisector 1 and a line extending perpendicularly from the coordinates $(x_o, y_o)$ corresponding to the correction values $x_o$ and $y_o$ to the bisector is obtained.

The coordinates $(x_p, y_p)$ are given by $$x_p = \{x_o + a(y_o - b)\}/(a^2 + 1) \tag{11a}$$

$$y_p = ax_o + b \tag{11b}$$

When the coordinate components $y_l$ and $y_n$ are equal to each other, the equation of the perpendicular bisector 1 becomes $$x = (x_l + x_n)/2 \tag{12}$$

Therefore, the coordinates $(x_p, y_p)$ are given by $$x_p = (x_l + x_n)/2 \tag{13a}$$

$$y_p + y_o \tag{13b}$$

Then, in the step 207, the components $x_p$ and $y_p$ of the coordinates $(x_p, y_p)$ are set as the correction amounts $x_o$ and $y_o$, respectively, and, after the correction signals $x_n$ and $y_n$ are set as the reference detection signals $x_l$ and $y_l$ in the step 208, it is returned to the main routine.

Therefore, when the orientation A of the vehicle 1 is changed during the movement thereof while the above operation is performed continuously, the amending operation of the correction values is performed through the steps 205 to 208, so that the correction amounts $x_o$ and $y_o$ approach the true correction amounts $x_{v2}$ and $y_{v2}$ required to cancel out the magnetic field Hv2. When the field Hv2 is further changed during the repetition of the above steps, the correction values $x_o$ and $y_o$ obtained as above also approach the true correction amounts required to cancel out the changed magnetic field. Therefore, in a case where the field Hv changes from time to time, the correction amounts $x_o$ and $y_o$ can be amended automatically during a normal movement of the vehicle 1 without necessity of turning required in the step 102 of the initial correction routine. As a result, the correction detection signals $x_h$ and $y_h$ obtained in the step 104 always indicate a more precise orientation of the vehicle.

Figure 10:
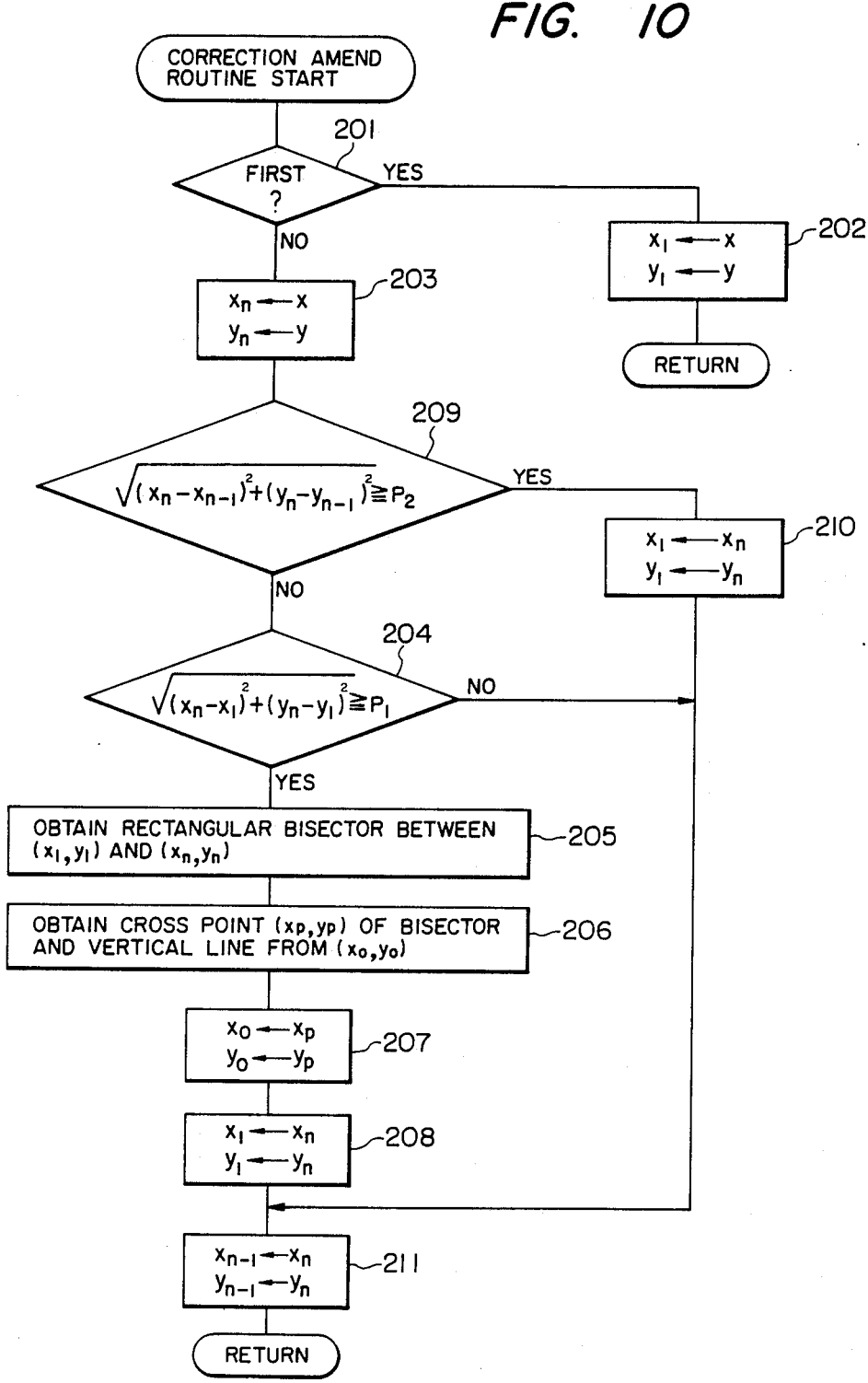
FIG. 10 is a flow-chart showing an operation of the microcomputer used in another embodiment of the present invention.

FIG. 10 is a flow chart showing another embodiment of the present invention, which is featured over the correction amending routine shown in FIG. 9b by a provision of the steps 209 to 211. In the step 209, it is determined whether or not a distance $\{(x_n - x_{n-1})^2 + (y_n - y_{n-1})^2\}^{\frac{1}{2}}$ between coordinates $(x_n, y_n)$ corresponding to a current detection signal and coordinates $(x_{n-1}, y_{n-1})$ corresponding to a preceding detection signal is equal to or larger than a second predetermined value $p_2$. If yes, the current detection signals $x_n$ and $y_n$ are set as reference detection signals $x_l$ and $y_l$ in the step 210. If no, it goes on through the steps 204 to 208 identical to those in FIG. 9a, to set the current detection signals $x_n$ and $y_n$ as the preceding detection signals $x_{n-1}$ and $y_{n-1}$ in the step 211 for subsequent operation.

Figure 5:
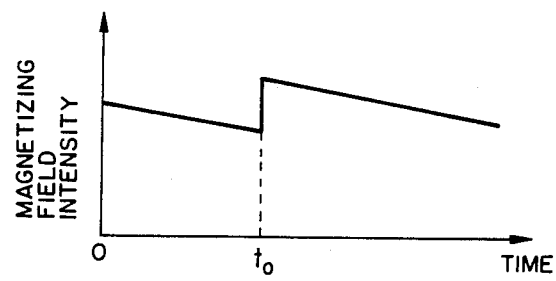
FIG. 5 is a graph illustrating a variation of magnetic field with time.

Accordingly, the embodiment in FIG. 10 provides the same effect as that obtained by the preceding embodiment and further provides an additional effect that, by judging the fact that the distance between the coordinates points changed during the period T to a value equal to or larger than the predetermined value $p_2$ is to indicate an occurrence of an abrupt change of magnetic field as shown in FIG. 5, an erroneous operation of the correction amounts $x_o$ and $y_o$ based on the detection signals $x_I$ and $y_I$ before the change of the magnetic field and the detection signals $x_n$ and $y_n$ after the change, i.e., the set of detection signal pairs the required correction amounts of which are different from each other is prevented.

In these embodiments described hereinbefore, the correction amounts $x_o$ and $y_o$ are amended when the distance between the coordinates $(x_1,y_1)$ and $(x_n,y_n)$ is equal to or larger than the predetermined value $p_I$ as in the step 204. The reason for this is to prevent an operation error of the perpendicular bisector from increasing substantially when the distance is too small and detection errors exist in the detection signal $x_I$ and $y_I$ and $x_n$ and $y_n$.

Therefore, if such detection error is negligible, it may be possible to operate the correction values $x_o$ and $y_o$ on the basis of the preceding and current detection signals $x_{n-1}, y_{n-1}, x_n$ and $y_n$, without using the step 204.

Although the present invention has been described with reference to the automobile as the vehicle, it may be any other vehicle such as ship and aircraft.

As mentioned hereinbefore, according to the present invention, the correction amounts for the changing magnetic field intensity can be amended automatically from time to time to thereby obtain the precise correction to the magnetic field.

We claim:

1. An orientation finder for use on a moving vehicle, comprising:
   a terrestrial magnetism sensor mounted on said vehicle for detecting a pair of orthogonal components of a horizontal component of terrestrial magnetism to provide a pair of detection signals corresponding to said orthogonal components, respectively;
   magnetization correction means for correcting said pair of detection signals with a pair of correction values necessary to cancel out an influence of a magnetic field produced by said vehicle itself and providing a pair of corrected detection signals; and
   correction amending means for obtaining a perpendicular bisector of a line connecting two points corresponding to said pair of detection signals from said terrestrial magnetism sensor and said pair of corrected detection signals from said magnetization correction means on a rectangular coordinate system to amend said correction values on the basis of coordinates of a cross-point of said perpendicular bisector and a line extending perpendicularly from a point corresponding to said correction values to said perpendicular bisector.

2. The orientation finder as claimed in claim 1, wherein said correction amending means amends said correction values when a distance between coordinates corresponding to a current detection signal pair from said terrestrial magnetism sensor and a preceding detection signal pair from said terrestrial magnetism sensor stored as a reference detection signal pair becomes equal to or larger than a first predetermined value.

3. The orientation finder as claimed in claim 1 or 2, wherein said correction amending means utilizes a current detection signal pair from said terrestrial magnetism sensor as a reference detection signal pair in obtaining said perpendicular bisector when a distance between coordinates corresponding to said current detection signal pair and a detection signal pair obtained by said terrestrial magnetism sensor and stored at a predetermined time after said current detection signal pair is obtained becomes equal to or larger than a second predetermined value.

4. An orientation finder for use on a moving vehicle, comprising:
   a terrestrial magnetism sensor mounted on said vehicle for detecting a pair of orthogonal components of a horizontal component of terrestrial magnetism to provide a pair of electric signals corresponding to said orthogonal magnetic field components, respectively;
   initial correction means responsive to an output of said sensor for obtaining correction amounts;
   magnetization correction means for correcting said pair of electric signals with said correction amounts obtained by said initial correction means and providing a pair of corrected electric signals;
   correction amending means for obtaining a perpendicular bisector of a line connecting two points corresponding to said pair of detection signals from said terrestrial magnetism sensor and said pair of corrected signals from said magnetization correction means on a rectangular coordinate system to amend said correction amounts on the basis of coordinates of a cross point of said perpendicular bisector and a line extending perpendicularly from a point corresponding to said correction amounts to said perpendicular bisector;
   angle calculation means responsive to an output of said magnetization correction means for calculating an angle between a moving direction of said vehicle and a direction of said horizontal component of terrestrial magnetism; and
   display means for displaying said angle.

5. The orientation finder as claimed in claim 4, wherein said initial correction means, said magnetization correction means, said correction amending means and said angle calculation means constitute a control device and said control device further comprises an A/D converter connected to an output of said terrestrial magnetism sensor, a microcomputer and a display driver connected to said display means.

* * * * *